(12) United States Patent
Stowell et al.

(10) Patent No.: US 6,413,578 B1
(45) Date of Patent: Jul. 2, 2002

(54) METHOD FOR REPAIRING A THERMAL BARRIER COATING AND REPAIRED COATING FORMED THEREBY

(75) Inventors: William R. Stowell, Rising Sun, IN (US); Robert A. Johnson, Simpsonville, SC (US); Andrew J. Skoog; Joseph Thomas Begovich, both of West Chester, OH (US); Thomas Walter Rentz, Cincinnati, OH (US); Jane Ann Murphy, Middletown, OH (US); Ching-Pang Lee, Cincinnati, OH (US); Dainel P. Ivkovich, Jr., Fairfield, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/687,721

(22) Filed: Oct. 12, 2000

(51) Int. Cl.$^7$ .............................. B05D 1/06; B05D 7/14
(52) U.S. Cl. ...................... 427/142; 427/140; 427/201; 427/226; 427/446; 427/453
(58) Field of Search ................. 427/140, 142, 427/201, 226, 446, 453

(56) References Cited

U.S. PATENT DOCUMENTS

| | | | | |
|---|---|---|---|---|
| 4,804,562 A | * | 2/1989 | Ferguson et al. ............ 427/140 |
| 5,626,923 A | * | 5/1997 | Fitzbibbons et al. ......... 427/535 |
| 5,736,198 A | * | 4/1998 | Yasutomi et al. ........... 427/419.7 |
| 5,972,424 A | * | 10/1999 | Draghi et al. ............... 427/142 |
| 5,985,368 A | * | 11/1999 | Sangeeta et al. .......... 427/376.4 |
| 6,010,746 A | * | 1/2000 | Descoteaux et al. ........ 427/142 |
| 6,036,995 A | * | 3/2000 | Kircher et al. .............. 427/142 |
| 6,045,863 A | * | 4/2000 | Olson et al. ................ 427/142 |

* cited by examiner

Primary Examiner—Shrive P. Beck
Assistant Examiner—Jennifer Kolb Michener
(74) Attorney, Agent, or Firm—Ernest Cusick; Gary M. Hartman; Domenica N.S Hartman

(57) ABSTRACT

A method of repairing a thermal barrier coating on a component designed for use in a hostile thermal environment, such as turbine, combustor and augmentor components of a gas turbine engine. The method more particularly involves repairing a thermal barrier coating on a component that has suffered localized spallation of the thermal barrier coating. After cleaning the surface area of the component exposed by the localized spallation, a ceramic paste comprising a ceramic powder in a binder is applied to the surface area of the component. The binder is then reacted to yield a ceramic-containing repair coating that covers the surface area of the component and comprises the ceramic powder in a matrix of a material formed when the binder was reacted. The binder is preferably a ceramic precursor material that can be converted immediately to a ceramic or allowed to thermally decompose over time to form a ceramic, such that the repair coating has a ceramic matrix. The repair method can be performed while the component remains installed, e.g., in a gas turbine engine. Immediately after the reaction step, the gas turbine engine can resume operation during which the binder is further reacted/converted and the strength of the repair coating increases.

17 Claims, 1 Drawing Sheet

METHOD FOR REPAIRING A THERMAL BARRIER COATING AND REPAIRED COATING FORMED THEREBY

FIELD OF THE INVENTION

This invention relates to thermal barrier coatings for components exposed to high temperatures, such as the hostile thermal environment of a gas turbine engine. More particularly, this invention is directed to a method for repairing a thermal barrier coating that has suffered localized spallation.

BACKGROUND OF THE INVENTION

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through the formulation of nickel and cobalt-base superalloys. Nonetheless, when used to form components of the turbine, combustor and augmentor sections of a gas turbine engine, such alloys alone are often susceptible to damage by oxidation and hot corrosion attack and may not retain adequate mechanical properties. For this reason, these components are often protected by an environmental and/or thermal-insulating coating, the latter of which is termed a thermal barrier coating (TBC) system. Ceramic materials and particularly yttria-stabilized zirconia (YSZ) are widely used as a thermal barrier coating (TBC), or topcoat, of TBC systems used on gas turbine engine components. These particular materials are widely employed because they can be readily deposited by plasma spray, flame spray and vapor deposition techniques.

To be effective, TBC systems must have low thermal conductivity, strongly adhere to the component, and remain adherent throughout many heating and cooling cycles. The latter requirement is particularly demanding due to the different coefficients of thermal expansion between ceramic topcoat materials and the superalloy substrates they protect. To promote adhesion and extend the service life of a TBC system, an oxidation-resistant bond coat is often employed. Bond coats are typically in the form of overlay coatings such as MCrAlX (where M is iron, cobalt and/or nickel, and X is yttrium or another rare earth element), or diffusion aluminide coatings. During the deposition of the ceramic TBC and subsequent exposures to high temperatures, such as during engine operation, these bond coats form a tightly adherent alumina ($Al_2O_3$) layer or scale that adheres the TBC to the bond coat.

The service life of a TBC system is typically limited by a spallation event brought on by thermal fatigue. Accordingly, a significant challenge of TBC systems has been to obtain a more adherent ceramic layer that is less susceptible to spalling when subjected to thermal cycling. Though significant advances have been made, there is the inevitable requirement to repair components whose thermal barrier coatings have spalled. Though spallation typically occurs in localized regions or patches, the conventional repair method has been to completely remove the thermal barrier coating, restore or repair the bond layer surface as necessary, and then recoat the entire component. Prior art techniques for removing TBC's include grit blasting or chemically stripping with an alkaline solution at high temperatures and pressures. However, grit blasting is a slow, labor-intensive process and erodes the surface beneath the coating. With repetitive use, the grit blasting process eventually destroys the component. The use of an alkaline solution to remove a thermal barrier coating is also less than ideal, since the process requires the use of an autoclave operating at high temperatures and pressures. Consequently, conventional repair methods are labor-intensive and expensive, and can be difficult to perform on components with complex geometries, such as airfoils and shrouds. As an alternative, U.S. Pat. No. 5,723,078 to Nagaraj et al. teach selectively repairing a spalled region of a TBC by texturing the exposed surface of the bond coat, and then depositing a ceramic material on the textured surface by plasma spraying. While avoiding the necessity to strip the entire TBC from a component, the repair method taught by Nagaraj et al. requires removal of the component in order to deposit the ceramic material.

In the case of large power generation turbines, completely halting power generation for an extended period in order to remove components whose TBC's have suffered only localized spallation is not economically desirable. As a result, components identified as having spalled TBC are often analyzed to determine whether the spallation has occurred in a high stress area, and a judgment is then made as to the risk of damage to the turbine due to the reduced thermal protection of the component, which if excessive can lead to catastrophic failure of the component. If the decision is to continue operation, the spalled component must typically be scrapped at the end of operation because of the thermal damage inflicted while operating the component without complete TBC coverage.

Accordingly, it would be desirable if a repair method were available that could be performed on localized spalled areas of TBC on turbine hardware without necessitating that the component be removed from the turbine, so that downtime and scrappage are minimized.

BRIEF SUMMARY OF THE INVENTION

The present invention provides a method of repairing a thermal barrier coating on a component that has suffered localized spallation of the thermal barrier coating. After cleaning the surface area of the component exposed by the localized spallation, a ceramic paste comprising a ceramic powder in a binder is applied to the surface area of the component. The binder is then reacted to yield a ceramic-containing repair coating that covers the surface area of the component and comprises the ceramic powder in a matrix of a material formed when the binder was reacted. The binder is preferably a ceramic precursor material that can be converted immediately to a ceramic or allowed to thermally decompose over time to form a ceramic, such that the repair coating has a ceramic matrix. According to the invention, each step of the repair method can be performed while the component remains installed, e.g., in a gas turbine engine. Immediately after the reaction step, the gas turbine engine can resume operation to further react/convert the binder, by which the strength of the repair coating increases.

In view of the above, it can be appreciated that the invention overcomes several disadvantages of prior methods used to repair thermal barrier coatings. In particular, the method of this invention does not require the thermal barrier coating to be completely removed, nor does the invention require removal of the component in order to repair its thermal barrier coating. As a further advantage, the repair process does not require a high temperature treatment, since the repair coating exhibits sufficient strength to withstand engine operation, during which time the precursor binder is gradually converted to form a ceramic matrix. As a result, minimal downtime is necessary to complete the repair and resume operation of the turbine engine. In the case of large power generation turbines, the cost is avoided of completely halting power generation for an extended period in order to remove, repair and then reinstall a component that has suffered only localized spallation. Also avoided is the need to decide whether or not to continue operation of the turbine until the spalled component is no longer salvageable at the risk of damaging the turbine.

Other objects and advantages of this invention will be better appreciated from the following detailed description.

DETAILED DESCRIPTION OF THE INVENTION

The present invention is directed to components protected by thermal barrier coatings for operation within environments characterized by relatively high temperatures, and therefore subjected to severe thermal stresses and thermal cycling. Notable examples of such components include the high and low pressure turbine nozzles and blades, shrouds, combustor liners and augmentor hardware of gas turbine engines for use in aircraft and industrial applications. While the advantages of this invention are particularly applicable to components of gas turbine engines, the invention is generally applicable to any component in which a thermal barrier coating is used to thermally insulate a component from its environment.

Figure 1:
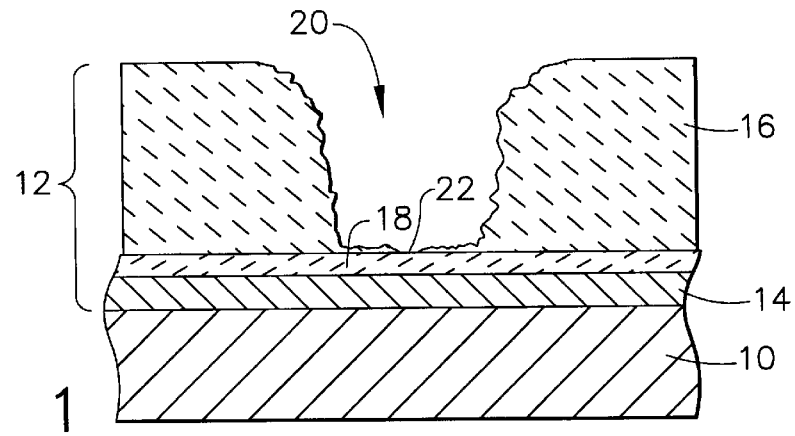
FIG. 1 is a cross-sectional representation of a component surface protected by a thermal barrier coating that has suffered localized spallation.

Represented in FIG. 1 is a surface region of a component 10 protected by a thermal barrier coating (TBC) system 12. The TBC system 12 is shown as being composed of a bond coat 14 formed on the surface of the component 10, and a ceramic layer 16 deposited on the bond coat 14 as the thermal barrier coating. As is the situation with high temperature components of gas turbine engines, the component 10 may be formed of a nickel, cobalt or iron-base superalloy. The bond coat 14 is preferably formed of a metallic oxidation-resistant material, so as to protect the underlying component 10 from oxidation and enable the ceramic layer 16 to more tenaciously adhere to the component 10. Suitable materials for the bond coat 14 include MCrAlX overlay coatings and diffusion aluminide coatings. Following deposition of the bond coat 14, an oxide scale 18 forms on the surface of the bond coat 14 at elevated temperatures. The oxide scale 18 provides a surface to which the ceramic layer 16 more tenaciously adheres, thereby promoting the spallation resistance of the ceramic layer 16.

The ceramic layer 16 is represented as having been deposited by plasma spraying, such as air plasma spraying (APS). A preferred material for the ceramic layer 16 is an yttria-stabilized zirconia (YSZ), a preferred composition being about 4 to about 8 weight percent yttria, though other ceramic materials could be used, such as yttria, nonstabilized zirconia, or zirconia stabilized by magnesia (MgO), ceria ($CeO_2$), scandia ($Sc_2O_3$) and/or other oxides. The ceramic layer 16 is deposited to a thickness that is sufficient to provide the required thermal protection for the component 10, typically on the order of about 50 to about 300 micrometers for most gas turbine engine components.

As a gas turbine engine component, surfaces of the component 10 are subjected to hot combustion gases during operation of the engine, and are therefore subjected to severe attack by oxidation, corrosion and erosion. Accordingly, the component 10 must remain protected from its hostile operating environment by the TBC system 12. Loss of the ceramic layer 16 due to spallation leads to premature and often rapid deterioration of the component 10. A localized spalled region 20 of the ceramic layer 16 is represented in FIG. 1, with the TBC repair process of this invention being represented in FIGS. 2 and 3. According to the invention, each of the following steps performed in the repair of the component 10 is performed while the component 10 remains installed in the turbine engine, thereby completely avoiding the prior requirement to remove and later reinstall the component.

The repair process begins with cleaning the surface 22 exposed by the localized spalled region 20 so as to remove loose oxides and contaminants such as grease, oils and soot, though preferably without damaging the oxide scale 18 or removing any residual fragments of the ceramic layer 16 that adhere to the scale 18. While various techniques can be used, a preferred method is to remove loose materials for the spalled region 20, and then clean the surface 22 with alcohol and/or acetone. This step can be selectively performed to ensure that the surrounding undamaged ceramic layer 16 is not subjected to the procedure.

Figure 2:
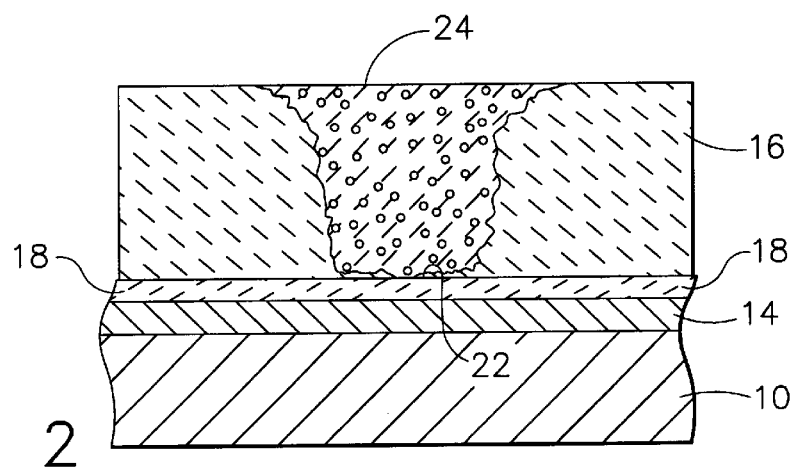
FIGS. 2 and 3 are cross-sectional representations of the component surface of FIG. 1 during the repair of the thermal barrier coating in accordance with the present invention.
Figure 3:
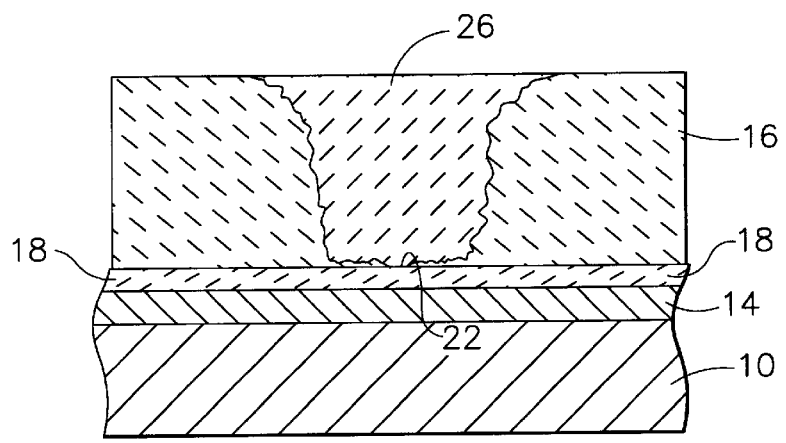

Once free of contaminants, the spalled region 20 is filled with a ceramic paste 24, as represented by FIG. 2. According to the invention, the ceramic paste 24 is a mixture of ceramic powders and a binder that when sufficiently heated forms a ceramic repair coating 26 shown in FIG. 3 as adhering to the surface 22, which may be defined by portions of the bond coat 14, oxide scale 18 and/or remnants of the ceramic layer 16. The ceramic powder preferably is a mixture of one or more refractory oxides, with preferred oxides including alumina, zirconia, hafnia, magnesia and silica. The binder is a ceramic precursor material, preferably a silicone or a phosphate-based composition, though it is foreseeable that other ceramic precursor binders could be used, including sol gel chemistries that thermally decompose to form refractory oxides, and possibly calcium aluminate cements. According to a preferred embodiment of the invention, the ceramic powder contains about 5 to about 85 weight percent alumina, 0 to about 60 weight percent zirconia, 0 to about 40 weight percent silica, 0 to about 55 weight percent hafnia, 0 to about 55 weight percent magnesia and 0 to about 25 weight percent zinc titanate. A ceramic powder that has been found particularly suitable contains about 42 weight percent alumina and about 58 weight percent zirconia. The ceramic powder is combined with the binder and a solvent in an amount sufficient to constitute about 50 to about 95 weight percent of the resulting ceramic paste 24. A powder to binder ratio of about 3 to 1 is generally preferred, such as when using the above-noted ceramic powder containing about 42 weight percent alumina and about 58 weight percent zirconia.

Preferred silicone binders include resins manufactured by GE Silicones under the names SR350 and SR355, and classified as a methylsesquisiloxane mixture of the polysiloxane family. These binders are preferably used in amounts of up to about 45 weight percent of the ceramic paste 24. Preferred phosphate-based binders include aluminum phosphate and complex phosphate materials that are commercially available from various sources such as Budenheim, Chemische Fabrik, in amounts of up to about 20 weight percent of the ceramic paste 24. The solvent content of the paste 24 will depend on the particular binder used, with the amount being sufficient to dissolve the binder. A suitable solvent for the preferred silicone and phosphate-based binders is an alcohol such as denatured alcohol (e.g., ethyl alcohol combined with 5% isopropyl alcohol) in an amount of about 5 to 65 weight percent of the paste 24.

The ceramic paste 24 may include additional additives, particularly one or more surfactants to achieve a suitably tacky consistency that enables the paste 24 to adhere to the composition at the surface 22, which as noted above may be defined by portions of the metallic bond coat 14, the oxide scale 18 and/or remnants of the ceramic layer 16. For example, up to about 10 weight percent of a nonionic surfactant may be desirable. Examples of suitable surfactants commercially available are P521A and Merpol from Witco and Stephan, respectively.

The paste 24 can be applied in any suitable manner, such as with a trowel. Depending on its composition, the binder of the paste 24 may react at room temperature, or its reaction accelerated by heating such as with a heat lamp, torch or other heat source until the strength of the resulting repair coating 26 has reached a required level for operation in the turbine engine. Suitable thermal treatments are about sixteen hours at room temperature to cure a silicone binder, and about two hours at about 150° C. to react a phosphate-based binder. During operation of the turbine engine, the repair coating 26 continues to react, associated with an increase in the strength and other mechanical properties of the coating 26. In the case where a silicone binder is used, the binder initially cures by polymerization to form a silicone matrix whose strength is sufficient for engine operation. With extended use at high temperatures, the silicone thermally decomposes to silica, forming a silica matrix in which the particles of the ceramic powder are dispersed. In the case where a phosphate-based binder is used, the binder chemically modifies the surfaces of the ceramic powder particles during the thermal treatment to form complex phosphate glasses and phosphate bonds. The complex glasses bind the powders together and form a matrix of high melting point phosphate glasses. With further exposure to high temperatures, such as during engine operation, the phosphate-based binder eventually migrates into the powder particles to form ceramic-to-ceramic bonds. Testing of repair coatings 26 with silicone as the binder has shown that, through the process of being converted from an unfired cured polymer matrix composition to a fully fired ceramic composition, the repair coatings 26 of this invention are characterized by enough residual strength to remain firmly adhered to the surface 22 within the spalled region 20 in the ceramic layer 16.

While the invention has been described in terms of a preferred embodiment, it is apparent that other forms could be adopted by one skilled in the art. Accordingly, the scope of the invention is to be limited only by the following claims.

What is claimed is:

1. A method for repairing a thermal barrier coating on a component that has suffered localized spallation of the thermal barrier coating, the method comprising the steps of:
    applying a ceramic paste on a surface area of the component exposed by the localized spallation, the ceramic paste comprising a ceramic powder in a binder, the ceramic powder comprising alumina and zirconia, the binder being chosen from the group consisting of ceramic precursor binders that thermally decompose to form a refractory material; and then
    heating the binder to yield a repair coating that covers the surface area of the component, the repair coating comprising the ceramic powder in a matrix that comprises the refractory material formed by reacting the binder.

2. A method according to claim 1, further comprising the step of cleaning the surface area of the component prior to the applying step so as to remove contaminants without removing any adherent residual fragments of the thermal barrier coating.

3. A method according to claim 1, wherein the ceramic powder further comprises at least one ceramic material chosen from the group consisting of hafnia, magnesia and silica.

4. A method according to claim 1, wherein the ceramic powder consists of about 5 to about 85 weight percent alumina, 0 to about 40 weight percent silica, up to about 60 weight percent zirconia, 0 to about 55 weight percent hafnia, 0 to about 55 weight percent magnesia and 0 to about 25 weight percent zinc titanate.

5. A method according to claim 1, wherein the ceramic powder comprises about 42 weight percent alumina and about 58 weight percent zirconia.

6. A method according to claim 1, wherein the binder is a silicone and constitutes up to about 45 weight percent of the ceramic paste.

7. A method according to claim 1, wherein the binder is a phosphate-based composition and constitutes up to about 20 weight percent of the ceramic paste.

8. A method according to claim 1, wherein the component is installed in a gas turbine engine.

9. A method according to claim 8, wherein the method is performed while the component remains installed in the gas turbine engine.

10. A method according to claim 1, wherein the gas turbine engine is operated after the reaction step during which the binder further reacts and the matrix consists of a ceramic material.

11. A method according to claim 1, wherein the thermal barrier coating is yttria-stabilized zirconia deposited on a metallic bond coat on the component by plasma spraying.

12. A method for repairing a thermal barrier coating on a component installed in a gas turbine engine and which has suffered localized spallation of the thermal barrier coating so as to expose a surface area defined at least in part by an oxide scale on the component, the method comprising the steps of:
    without removing the component from the gas turbine engine, cleaning the surface area of the component exposed by the localized spallation so as to remove contaminants without damaging the oxide scale;
    applying a ceramic paste on the surface area of the component, the ceramic paste comprising a ceramic powder in a ceramic precursor binder dissolved in a solvent, the ceramic powder comprising at last one ceramic material chosen from the group consisting of alumina, zirconia, hafnia, magnesia and silica, the binder being chosen from the group consisting of phosphate-based compositions;
    evaporating the solvent and heating the ceramic paste to yield a ceramic-containing repair coating that covers the surface area of the component, the repair coating comprising the ceramic powder in a matrix consisting of a phosphate glass material formed by thermal decomposition of the binder; and then
    operating the gas turbine engine during which the phosphate glass material forms ceramic-to-ceramic bonds with the ceramic powder.

13. A method according to claim 12, herein the ceramic powder consists of about 5 to about 85 weight percent alumina, 0 to about 40 weight percent silica, 0 to about 60 weight percent zirconia, 0 to about 55 weight percent hafnia, 0 to about 55 weight percent magnesia and 0 to about 25 weight percent zinc titanate.

14. A method according to claim 12, wherein the ceramic powder consists of about 42 weight percent alumina and about 58 weight percent zirconia.

15. A method according to claim 12, wherein the ceramic powder comprises alumina and zirconia.

16. A method according to claim 12, wherein the binder constitutes up to about 20 weight percent of the ceramic paste.

17. A method according to claim 13, wherein the thermal barrier coating is yttria-stabilized zirconia deposited on a metallic bond coat on the component by plasma spraying.

* * * * *